(No Model.)

W. W. WHIDDIT.
FILTER.

No. 461,004. Patented Oct. 13, 1891.

WITNESSES
Harry King
P. A. Lee

INVENTOR:
William W. Whiddit,
By Irwin Elting
Attorney.

THE NORRIS PETERS CO., PHOTO-LITHO., WASHINGTON, D. C.

UNITED STATES PATENT OFFICE.

WILLIAM W. WHIDDIT, OF NEWBURG, NEW YORK.

FILTER.

SPECIFICATION forming part of Letters Patent No. 461,004, dated October 13, 1891.

Application filed February 24, 1891. Serial No. 382,321. (No model.)

*To all whom it may concern:*

Be it known that I, WILLIAM W. WHIDDIT, a citizen of the United States, residing at Newburg, in the county of Orange and State of New York, have invented certain new and useful Improvements in Filters; and I do hereby declare the following to be a full, clear, and exact description of the invention, such as will enable others skilled in the art to which it appertains to make and use the same.

My invention relates to filters in which reversible reservoirs are used and the filtering material contained within fine screens; and the object of my improvement is to facilitate a thorough cleansing of the filtering material by the simple reversal of the filter-reservoirs and the flushing of the filtering material in this reversed position. I attain this object by the device illustrated in the accompanying drawings, in which—

Figure 1:
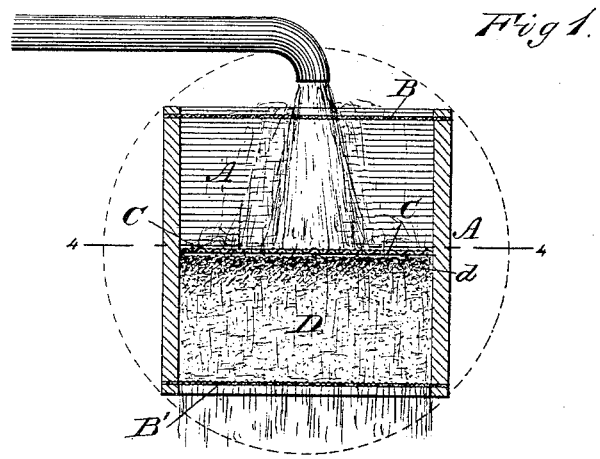
Figure 2:
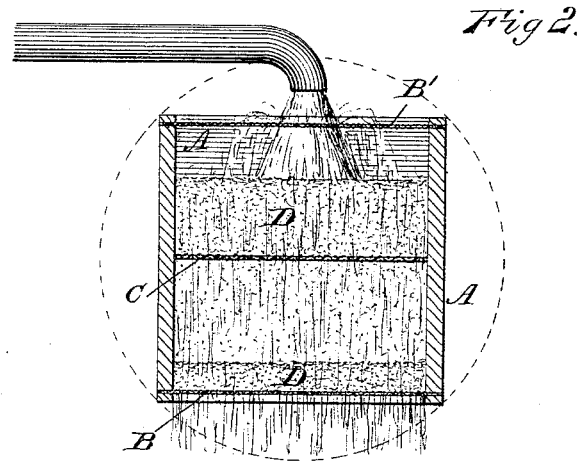
Figure 3:
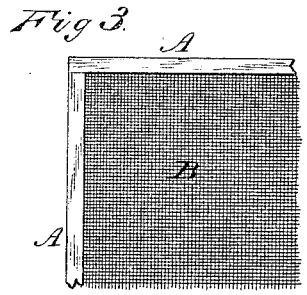
Figure 4:
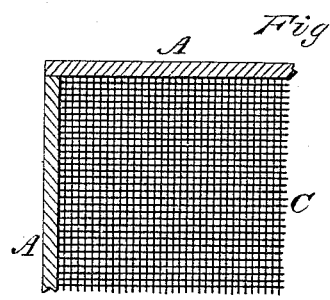

Figure 1 is a transverse section of a filter-reservoir to which my device is applied. Fig. 2 is a similar view of the same reservoir reversed and showing the filtering material passing downward during the cleansing process. Fig. 3 is a top plan view of a portion of a filter, showing the fine-mesh screen which prevents the escape of the filtering material; and Fig. 4 is a horizontal section of a portion of filter through line 4 4 of Fig. 1, showing a coarse-mesh screen through which the filtering material may pass during the cleansing process.

Similar letters refer to similar parts throughout the several views.

A represents the reservoir of any reversible filter.

B B' are screens of a fine mesh, which confine the filtering material, and may be made removable. They may be fixed near the top and bottom of the reservoir, as shown in the drawings, or they may be fastened nearer the center of the reservoir, according as convenience demands.

C represents an intermediate coarse-mesh screen, which is attached somewhere between the fine-mesh screens and constitutes my device for more thoroughly cleansing the filtering material of reversible filters without the removal of the filter-bed.

D represents any suitable filtering material placed between B B, and *d* represents that portion of it which has become clogged with sediment and other impurities in the water. Hitherto in reversible filters this clogged portion of the filter-bed containing most of the impurities has not been thoroughly separated and cleansed by simply reversing the reservoir and passing a stream of water through it, and the filtering material has thus tended to become more and more clogged with impurities, which necessitated frequent changing of the filter-bed in order to keep it in proper condition for purifying the water. By my invention of the intermediate coarse-mesh screen C this clogging with impurities is more effectually avoided than by any means hitherto employed, without an entire removal of the filtering material, and a consequent loss in time and an increase in cost. The size of the mesh of this screen should be such as to allow the moderately-slow passage through it of all the particles of the filtering material when the reservoir is reversed, as shown in Fig. 2. This separation of each particle of the filter-bed in order to pass through the screen C affords opportunity for cleansing the filter almost perfectly by simply a reversal of the reservoir and flushing it with water. Different kinds of filtering material might require screens having different-sized meshes, and the screens may be made of any suitable material; but they are preferably made of wire or some kind of metal.

It will be readily seen that my improvement is useful for and applicable to any reversible filter, and that it constitutes a valuable addition to the filter described in Letters Patent No. 444,623, granted to me January 13, 1891.

My cleansing-screen may be permanently or removably attached at any desired portion of the reservoir intermediate between the screens which confine the filtering material; but it is preferably about midway between them.

Having thus described my invention, what I claim, and desire to secure by Letters Patent, is—

1. In a reversible filter, an intermediate screen through which the particles of the filtering material will pass, as and for the purpose described.

2. In a filter, the combination of the fine-mesh screens B B', confining the filtering material, and a coarser intermediate screen C, through which the filtering material will pass when the filter is reversed for the purpose of thoroughly cleansing the filter-bed, as set forth.

In testimony whereof I affix my signature in presence of two witnesses.

WILLIAM W. WHIDDIT.

Witnesses:
   IRVING ELTING,
   SILAS WODELL.